Aug. 5, 1969  K. G. BACHELLER  3,459,207
FAUCET CONSTRUCTION

Filed April 20, 1965  3 Sheets-Sheet 1

Kenneth G. Bacheller
INVENTOR.

BY
Attorneys

Aug. 5, 1969   K. G. BACHELLER   3,459,207
FAUCET CONSTRUCTION
Filed April 20, 1965   3 Sheets-Sheet 2
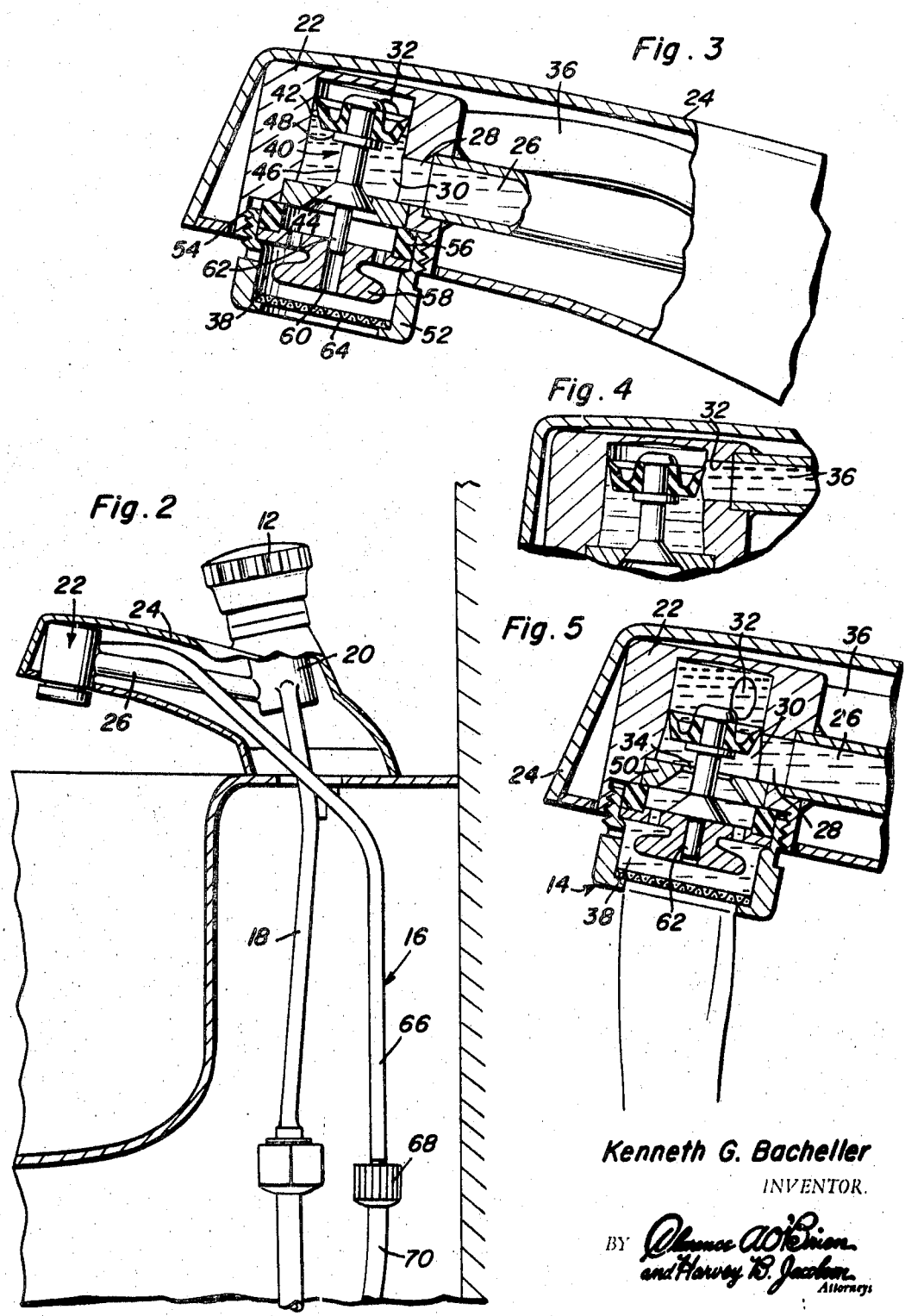
Kenneth G. Bacheller
INVENTOR.

Aug. 5, 1969  K. G. BACHELLER  3,459,207
FAUCET CONSTRUCTION
Filed April 20, 1965  3 Sheets-Sheet 3
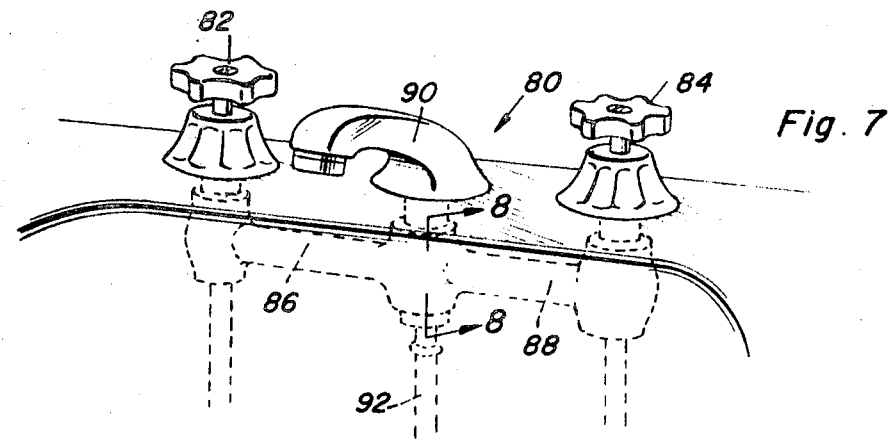
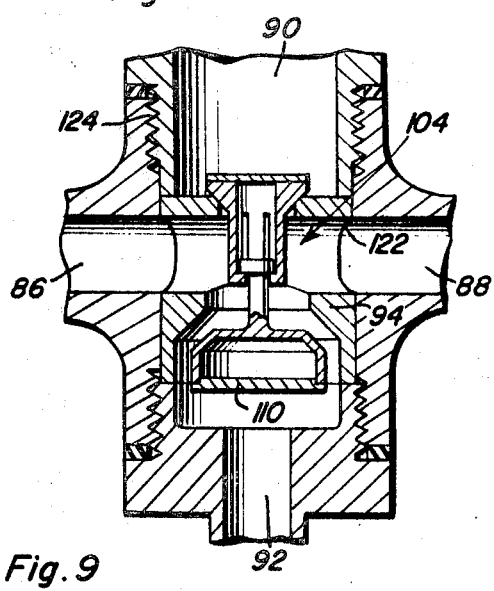
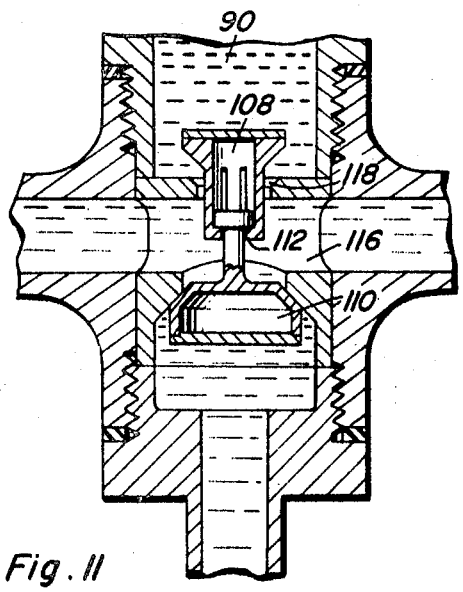
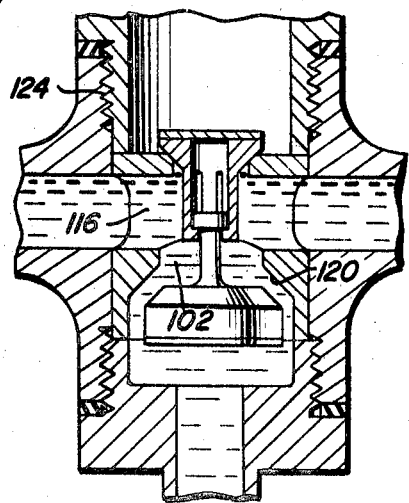
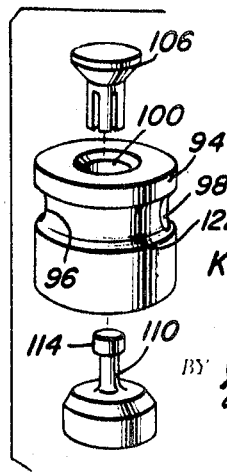
Kenneth G. Bacheller
INVENTOR.

3,459,207
FAUCET CONSTRUCTION
Kenneth G. Bacheller, Tucson, Ariz.
(310 Alexander Palm Road, Boca Raton, Fla. 33432)
Filed Apr. 20, 1965, Ser. No. 449,511
Int. Cl. F16k 11/10, 21/18
U.S. Cl. 137—119                    5 Claims

ABSTRACT OF THE DISCLOSURE

A diverter valve utilized in conjunction with a faucet for selectively discharging the water either through the conventional spout or through an auxiliary line. The valve construction includes a pair of fluid outlets to the opposite sides of a fluid inlet line in conjunction with a double-headed valve unit slidably movable between the two outlets for a selective exposure of the outlets. Valve seating surfaces are provided to each side of the point at which the fluid line communicates with the valve housing so as to cooperate with the valve in effecting a selective sealing of the outlets. One form of valve element utilized includes two valve portions movable both together and relative to each other.

---

This invention relates generally to a faucet construction and primarily to a fluid control valve, automatically actuated by fluid pressure, which is capable of diverting fluid under pressure from one outlet to another, and at the same time preventing the fluid from flowing in a reverse direction upon a drop of pressure.

It is an object of this invention to provide automatic, simple, inexpensive and convenient structure for washing, irrigating, and shampoo rinsing utilizing minimum space requirements while presenting a sightly and attractive appearance.

A further object of this invention is to provide a faucet attachment which is safe and sanitary and readily adaptable to existing as well as new structures.

Another object of this invention is to provide a valve controlled device for use in a faucet to make it possible to adjust the temperature and water flow from a faucet spout and then automatically divert the water flow to a flexible hose.

It is a further object of this invention to provide a faucet valve which is automatically responsive to a line water pressure and which may be controlled from a remote position to direct water selectively to either of two channels.

It is a still further object of this invention to provide a novel fluid control valve structure to be used with single lever mixing faucets, and a modified fluid control valve structure to be used with double lever faucets.

It is a still further object of this invention to provide a new and novel valve structure for faucets which combines fluid control, anti-backflow, and anti-syphon features.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical sectional view, through the single lever mixing faucet embodying the present invention;

FIGURE 3 is a partial cross-sectional view of the valve structure, on an enlarged scale, comprising the present invention illustrated in a first operative position;

FIGURE 4 is a partial cross-sectional view illustrating further details of the valve structure comprising the present invention;

FIGURE 5 is a view similar to FIGURE 3 illustrating a second operative position of the valve structure forming the present invention;

FIGURE 7 is a perspective view of a double lever faucet embodying a modified form of the present invention;

FIGURE 8 is a cross-sectional view, on an enlarged scale, taken substantially along the line 8—8 of FIGURE 7, illustrating the modified valve in a first position;

FIGURE 9 is a view similar to FIGURE 8 illustrating the valve in a second operative position;

FIGURE 10 is a view similar to that of FIGURE 8 illustrating the valve in the third operative position; and FIGURE 11 is a view showing the valve housing with the valve structure comprising the present invention exploded therefrom.

Figure 1:
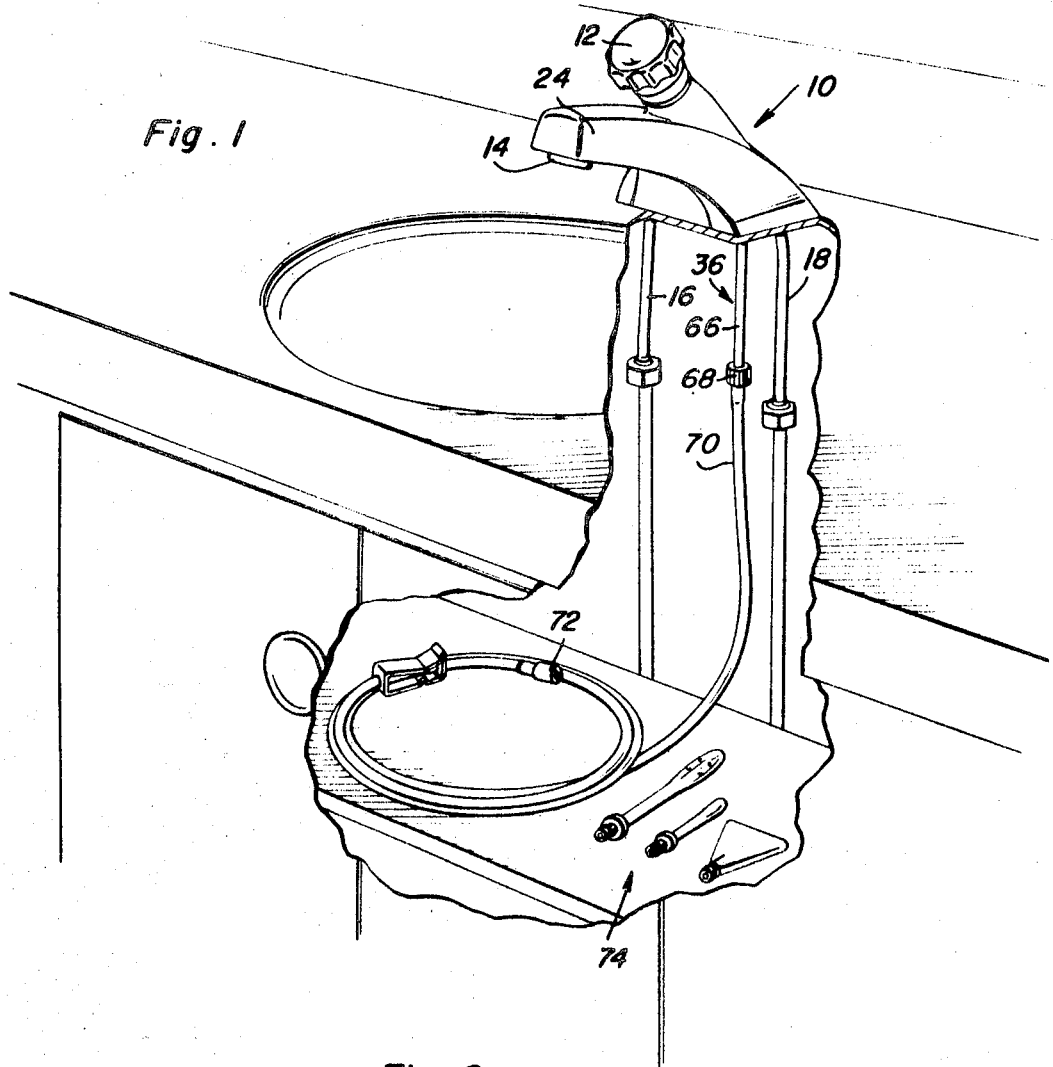
FIGURE 1 is a prespective view, partially broken away, of a single lever mixing faucet embodying the present invention.
Figure 6:
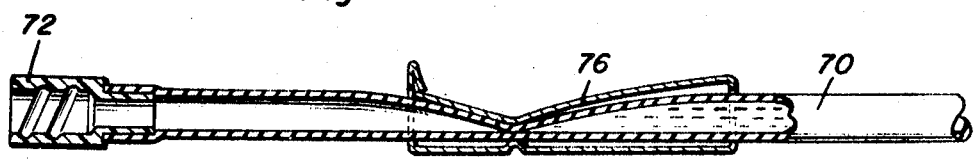
FIGURE 6 is a cross-sectional view of the flexible hose and clamping device forming a part of the present invention.

Referring now more particularly to the drawings, FIGURES 1–3 illustrate a conventional single lever mixing faucet 10, with handle 12, spout 14, hot water line 16, cold water line 18, mixing valve 20 and valve housing 22. Faucet body 24 houses the aforementioned components.

Supply line 26 delivers the fluid from the mixing valve 20 to valve housing 22 through opening 28 therein, the fluid flowing into chamber 30. Chamber 30 has a radial opening 32 at the upper end thereof and an axial opening 34 in the bottom thereof leading to divert line 36 and exit spout 38 respectively.

Located within chamber 30 is a dumbell valve indicated generally at 40, which has an upper valve portion 42 made preferably of rubber or the like, and lower valve portion 44 which is formed integrally with stem 46. Upper valve portion 42 is mounted on stem 46 by a conventional washer 48. Upper valve portion 42 is made with larger surface area than lower valve portion 44. Valve seat 50 is also located within chamber 30, preferably being forced therein for a permanent fit.

A cap 52 is screwed into valve housing 22 as at 54 to retain washer 56 and diverter 58 in front of opening 34 from housing 22. Diverter 58, preferably formed of plastic material, has guide track opening 60 therein to receive a guiding pin 62 which is an extension of and integrally formed with stem 46 of dumbell valve 40. A screen member 64 is located within the cap 52 adjacent diverter 58 to provide for even flow of fluid from the faucet.

Diverter line 36 includes a first non-flexible portion 66, a connector 68, and flexible hose portion 70. Flexible hose 70 terminates in the head portion 72 which contains conventional threads for mounting various spray or nozzle type attachments 74. A clamping or closure device 76 is used to selectively allow fluid to flow through head 72.

The operation of the valve device is explained as follows: Upper valve member 42 is of larger surface area than lower valve member 44. In the operative position illustrated in FIGURE 3, clamping member 76 on flexible tube 70 is open thereby allowing fluid to flow through head 72. Fluid under pressure flowing into chamber 30 through line 26, and due to the larger surface area of valve portion 42, forces dumbbell valve 40 upwardly in chamber 30 thereby seating lower valve portion 44 in valve seat 50. Outlet 34 is therefore maintained closed and opening 32 is open whereby fluid flows through divert line 36. As will be appreciated from FIGURE 3 the valve portion 42 does not rise to the top of the chamber 30, thereby leaving the upper portion of the chamber 30 in communication with divert line 36. When clamping member 76 is closed, thereby terminating the flow of fluid through divert line 36, the water will flow about the valve portion 42 and fill the top of the chamber 30 thereover thus equalizing the pressure on both sides of the valve portion 42. In the meantime the water pressure in the chamber 30 above the valve portion 44, being greater than the atmospheric pressure therebelow, operates in conjunction with the force of gravity to move dumbbell valve 40 downwardly, thereby unseating valve portion 44 and terminating the flow of fluid to outlet opening 32 while allowing the fluid to flow through outlet 34, past diverter 58 and thorugh screen 64. Pin member 62 guides dumbbell valve 40 as it moved down through chamber 30. To again direct the flow through divert line 36, one need merely open the clamp 76. This will allow the line 36 to drain, and the top of the chamber 30 to drain, thus causing a reduction in pressure above the valve portion 42. At this point, the water pressure between the valve portions 42 and 44 will, because of the greater area of the face of the valve portion 42 force the valve 40 upwardly and seal off outlet 34.

Upon cessation of flow of fluid through line 26 to chamber 30, dumbbell valve member 40 will fall through chamber 30 thereby unseating valve member 44 while at the same time preventing any backflow of fluid from line 36.

Referring now to a modification of the present invention illustrated in FIGURES 7 through 11, reference numeral 80 relates generally to a double lever faucet body comprising handles 82, 84, hot water line 86, and cold water line 88. Reference numeral 90 refers to the faucet spout, and reference numeral 92 refers to the divert line.

The automatic valve structure in this embodiment of the invention comprises valve housing 94 with hot water opening 96, cold water opening 98, spout opening 100, and divert line opening 102. Two-piece dumbbell valve 104 includes a first slotted valve portion 106 having internal guide tack 108 therein, and a second floatable valve portion 110. First valve portion 106 includes flange members 112, and second valve portion 110 includes shoulder member 114 which rides within the track 108 and abuts flange members 112. Valve housing 94 includes chamber 116 and valve seats 118 and 120. Valve portion 110 is constructed to be buoyant in water.

The operation of this embodiment of automatic valve is as follows: Absent fluid flow from lines 86, 88, valve portion 106 will be normally seated in valve seat 118 and valve portion 110 will depend therefrom below its seat 120. Fluid flowing through lines 86 and 88 enters chamber 116 through openings 96, 98. Whether or not divert line 92 is open, water will flow by the second valve portion 110 and into the line 92 because of the greater exposed surface area of valve portion 110 as compared to the valve portion 106. If the divert line 92 is open, the valve portion 110 will be maintained open and simultaneously effect a pull on valve portion 106 to effect a sealed seating thereof on its seat 118 thereby closing off the spout line 90. Shoulder 114 will slide in track 108 and abut flange 112, thereby pulling down upper valve portion 106 and seating it in valve seat 118. If the divert line 92 is closed, the water pressure on both sides of the valve portion 110 will be quickly equalized, thereby allowing the portion 110 to float upward into engagement with its seat 120. At this point, the water pressure within the chamber 116, being greater than the atmospheric pressure above valve portion 106, will cause a lifting of portion 106 off its seat 118 thereby directing the flow through the spout 90.

Thus, it may be appreciated that in either embodiment of this invention, when the divert line is closed the valve mechanism will automatically allow fluid to flow from the faucet spout, thereby allowing for a volume and temperature check of the water, and upon release of the closure member on the divert line, the valve mechanism will automatically cause the flow of water to be diverted from the spout to the divert line. It may be further appreciated that second valve portion 110 will operate as a backflow check due to its floatabiliy, and first valve portion 106 will operate as a pressure release for the divert line, when the divert line is closed.

A circumferential groove 122 is provided in valve housing 94 to permit random positioning of the housing without affecting the distribution of water thereby. That is, if openings 96 and 98 are not positioned over the lines 86 and 88, the incoming water will flow through groove 122 to reach the openings 96 and 98. The spout line 90 has a threaded portion 124 which is larger in diameter than valve housing 94. This permits repair and replacement from above as well as below, thereby making servicing more convenient.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A faucet construction comprising a faucet body, means for supplying fluid to the faucet body, valve housing means positioned within said faucet body for receiving fluid from said fluid supplying means, spout means connected to said faucet body for conveying said fluid out of said faucet body, a divert line connected to said faucet body for conveying said fluid out of said faucet body, valve means positioned within said valve housing means for automatically and selectively controlling the flow of fluid out of said faucet body whereby said fluid may be directed through said spout means or said divert line, a chamber within said valve housing means about said valve means for receiving fluid from said fluid supply means, a first outlet in said chamber leading to said spout means, a second outlet in said chamber leading to said divert line, said valve means comprising a two-piece valve having a first valve portion adapted for sliding movement within said valve housing means, said first valve portion including an internal guide track, and a second valve portion having a section thereof adapted for sliding movement within said internal guide track.

2. The apparatus of claim 1 wherein said first and second valve portions are adapted to cover said first and second outlets respectively, said second valve portion being of larger surface area than said first valve portion, said valve housing means including valve seats for seating said first and second valve portions, whereby fluid flow into said chamber will normally cause said first valve portion to seat and the second valve portion to unseat thereby allowing fluid to flow through said second outlet.

3. The apparatus of claim 2 wherein said second valve portion is floatable in fluid and orientated vertically with its seat there-above whereby upon a closing of the divert line, the fluid pressure to each side of the second valve portion is equalized, thereby causing a seating of said second valve portion to prevent backflow of said fluid.

4. The apparatus of claim 2 including inlet means to said valve housing means from said fluid supply means, said valve seats each being of a generally conical configuration and converging toward each other from opposite sides of said inlet means, said valve portions including conical valve heads located outward of the respective seats and selectively movable inward into seating engagement within the conical seats.

5. Valve structure comprising a valve housing, at least one inlet and two outlets in said housing, a pair of flowpaths in said housing, one between the inlet and each outlet, a two-piece dumbbell valve including a first valve portion positioned for sliding movement within said valve housing, said first valve portion including a longitudinally extending section having an internal guide track, a second valve portion, said second valve portion having a longitudinally extending section adapted for limited sliding movement within said internal guide track for movement of said second valve portion both with and relative to said first valve portion, and valve seats mounted in said valve housing, one in each flowpath, for seating said first and second valve portions, said valve seats being spaced relative to each other and in the paths of movement of the valve portions whereby upon movement of said dumbbell valve in said housing said first and second valve portions will be selectively seated and unseated.

References Cited

UNITED STATES PATENTS

| | | | |
|---|---|---|---|
| 682,269 | 9/1901 | Poe | 251—10 X |
| 2,652,850 | 9/1953 | Manville | 137—218 |
| 2,949,933 | 8/1960 | Moen | 137—119 X |
| 2,990,843 | 7/1961 | Smith | 137—218 |
| 3,056,418 | 10/1962 | Adams et al. | 137—119 |
| 3,265,082 | 8/1966 | Perlman | 137—119 |

FOREIGN PATENTS 1,358,478  3/1964  France.

WILLIAM F. O'DEA, Primary Examiner

DAVID J. ZOBKIW, Assistant Examiner

U.S. Cl. X.R.

137—389, 597